US012049074B2

(12) United States Patent
Haaf

(10) Patent No.: US 12,049,074 B2
(45) Date of Patent: Jul. 30, 2024

(54) COUNTERFEIT-PROOF MARKING OF INDIVIDUAL PRIMARY PACKAGING MEANS USING DIGITAL PRINTING OF CERAMIC INKS WITH SPECTRAL MARKERS

(71) Applicant: Gerresheimer Glas GmbH, Düsseldorf (DE)

(72) Inventor: Lothar Haaf, Gelchsheim (DE)

(73) Assignee: Gerresheimer Glas GmbH, Düsseldorf (DE)

( * ) Notice: Subject to any disclaimer, the term of this patent is extended or adjusted under 35 U.S.C. 154(b) by 17 days.

(21) Appl. No.: 17/697,537

(22) Filed: Mar. 17, 2022

(65) Prior Publication Data

US 2022/0297448 A1 Sep. 22, 2022

(30) Foreign Application Priority Data

Mar. 18, 2021 (EP) ..................................... 21163466

(51) Int. Cl.
*B41J 11/00* (2006.01)
*B41M 3/14* (2006.01)

(52) U.S. Cl.
CPC ............ *B41J 11/0021* (2021.01); *B41M 3/14* (2013.01)

(58) Field of Classification Search
CPC ............ C03C 2217/72; C03C 2217/74; C03C 2218/32; B41M 5/0047; B41M 5/007; B41M 3/144; B41M 1/34; C09D 11/322
See application file for complete search history.

(56) References Cited

U.S. PATENT DOCUMENTS

| | | | |
|---|---|---|---|
| 8,329,485 B2* | 12/2012 | McKean | C09K 11/08 427/64 |
| 11,254,864 B2* | 2/2022 | Doherty | G02B 6/0053 |
| 2004/0202795 A1* | 10/2004 | Sakoske | C03C 8/14 427/554 |
| 2005/0103424 A1* | 5/2005 | Nguyen | H05B 33/14 |
| 2016/0252656 A1* | 9/2016 | Waldschmidt | B23K 26/361 362/259 |

FOREIGN PATENT DOCUMENTS

| | | | |
|---|---|---|---|
| CN | 103666112 | | 1/2016 |
| CN | 106366761 | | 2/2017 |
| CN | 115448734 A | * | 12/2022 |
| EP | 2168774 | | 3/2010 |
| WO | WO 2020/187142 | | 9/2020 |

OTHER PUBLICATIONS

European Search Report and Opinion dated Sep. 2, 2021 in corresponding European Application No. 21163466.2.

* cited by examiner

*Primary Examiner* — John Zimmermann
(74) *Attorney, Agent, or Firm* — Leydig, Voit & Mayer, LTD.

(57) ABSTRACT

The present invention relates to a method 500 for digital printing on a substrate 100. The method comprising the following steps: a. providing 510 the substrate 100, and b. digital printing 530 at least one ceramic ink on the substrate 100. The at least one ceramic ink comprises a spectral marker, wherein the spectral marker is configured to emit a pre-defined light spectrum.

17 Claims, 3 Drawing Sheets

COUNTERFEIT-PROOF MARKING OF INDIVIDUAL PRIMARY PACKAGING MEANS USING DIGITAL PRINTING OF CERAMIC INKS WITH SPECTRAL MARKERS

CROSS REFERENCE TO RELATED APPLICATIONS

This patent application claims the benefit of and priority to European Patent Application No. 21163466.2 filed Mar. 18, 2021, which is hereby incorporated by reference in its entirety to the extent not inconsistent herewith.

BACKGROUND OF THE INVENTION

The present invention relates to the field of digital printing on a substrate, in particular a packaging means comprising glass. Specifically, the present invention relates to a method for digital printing on a substrate, to a printed container, to a ceramic ink and to a system for digital printing.

In recent years an increasing trend of product piracy, product counterfeiting or brand piracy is to be noted. Those imitated products or goods are manufactured with the aim of being confusingly similar to an original product. In doing so, not only intellectual property rights or competition law regulations are violated, but oftentimes, those imitated products have worse quality and may include severe safety deficiencies, thereby harming the reputation of the original. Even worse, in the field of medical products, imitated products may have no or reduced medicinal effect and/or may even lead to unpredictable side effect, thereby threatening health and live of the patients that to trust in the medical effect of the original product. Thus, there is a need in the art to ensure the authenticity of those products.

For ensuring the authenticity of various products, security features are required which guarantee a copy protection and thus prevent counterfeiters to place counterfeit products on the market, or at least allow to easily identify imitated products. Particularly for high-priced products or medical products, such as vaccines or other medicals (inter alia cough syrup, eye drops, nose drops, antibiotics, infusion solutions, saline solutions, blood and plasma reserves), a verification of the authenticity is indispensable in order to avoid reputative, financial and/or physical damage.

Particularly desirable are security features that are easy to apply, preferably in a manufacturing process of the goods, and at the same are difficult to reproduce for counterfeiters. Moreover, it is oftentimes required that the security feature can be verified quickly, especially if the verification process has to be conducted frequently and/or the quantities to be verified are large.

Known security features which are easy to apply, e.g. by means of a printing process, in a manufacturing process are typically provided as visible security features, such as serial numbers and machine readable elements (e.g. a data matrix code, a barcode, and/or a QR code). Further, such visible security features allow a quick verification for example by a respective scanning device, such as a camera or a code reader. However, visible security features may be copied by counterfeiters simply by reproducing the visible properties of the security feature. Exemplary, a QR code which is printed on a vial of a vaccine may be reproduced by counterfeiters on another vial by means of widely available printing technology. Moreover, visible security features may change the appearance or even the functionality of the product to be marked undesirably.

Security features which are more difficult for counterfeiters to reproduce are e.g. invisible security features, such as chemical markers and specific material combinations for the product to be protected against counterfeiting. However, such invisible security features are also more difficult and expensive to apply due to their complexity and cannot be verified as quickly as visible security features, since a purely optical verification is impossible.

Thus, there is a need in the art to improve the security features and to provide a security feature that is easy to apply in a manufacturing process and can be verified quickly while at the same time it is difficult to reproduce for counterfeiters.

SUMMARY OF THE INVENTION

This object is at least partially achieved by a method for digital printing on a substrate, by a printed container, by a ceramic ink and by a system for digital printing, as specified in the independent claims. Further aspects of the invention are defined in the dependent claims and in the following description.

Particularly, the object is achieved by a method for digital printing on a substrate, in particular a packaging means comprising glass.

The method for digital printing on a substrate comprises at least the steps of providing the substrate and digital printing at least one ceramic ink on the substrate.

The step of providing the substrate may include that the substrate is supported or retained by a supporting or retaining means, such as a frame or a rack, to facilitate handling and/or further processing. Additionally or alternatively, the step of providing the substrate may include that the substrate is provided by an automatic delivery device, such as a robot or an automatic conveyor device. Further, providing the substrate may take place in direct continuation to the manufacturing process of the substrate. For example, a vial made of glass may be provided directly after being formed by a glass forming machine. Hence, the efficiency may be increased by reducing intermediate steps.

During the step of digital printing at least one ceramic ink is printed on the substrate. For printing the substrate, the printer may be moved relative to the substrate, and/or the substrate may be moved relative to the printer. The step of digital printing may include inkjet printing for example with a continuous inkjet printer or a drop-on-demand inkjet printer. Moreover, the step of digital printing may include that each substrate is printed individually so that each substrate may be individually distinguishable.

Generally, digital printing refers to a printing technique of printing from a digital-based image directly to a variety of substrates. Digital printing allows to print different elements on a small number of substrates. Particularly, an individual printing of each substrate on demand becomes possible, without increasing costs. Compared to more traditional printing techniques, such as offset printing, screen printing or pad printing, it is not required to manufacture (and respectively to replace) any analog intermediate printing means, such as a printing plate, printing mesh, printing pad, and/or the like.

The ceramic ink used for the digital printing may be a ceramic inkjet ink. Further the ceramic ink may comprise a glass frit, at least one pigment, at least one dispersant, at least one solvent, and/or at least one binder.

Using a ceramic ink is beneficial since the ceramic ink may endure temperatures preferably up to 700° C., more preferably up to 800° C., even more preferably up to 900° C. and most preferably up to 1000° C. This allows the usage of the substrate with the ceramic ink imprint in harsh environments, such as in high temperature environments. This allows inter alia post processing of the printed substrates, without risking damaging the imprint.

The at least one ceramic ink digitally printed on the substrate comprises a spectral marker. The spectral marker is configured to emit a pre-defined light spectrum. The spectral marker may comprise particles, in particular ceramic particles. Further, the spectral marker may comprise different materials, including at least one of ceramics, minerals, glass and/or metals.

The spectral marker may be provided in form of a powder, a liquid, a dispersion, e.g. of a liquid and particles dispersed therein, a combination thereof and/or in any other suitable configuration. The pre-defined light spectrum of the spectral marker may be set during the production process of the spectral marker. Exemplary, the pre-defined light spectrum of a spectral marker which comprises ceramic particles may be set by a particular firing of the ceramic particles in a kiln.

The light spectrum of the spectral marker may be detectable by a spectral analysis device and may be defined as the pre-defined light spectrum for reference purposes. The pre-defined light spectrum may be characterized regarding the occurring wavelength (or wavelengths) and/or the occurring intensity (or intensities). By varying the characteristics of the pre-defined light spectrum, different spectral markers become distinguishable.

The pre-defined light spectrum may serve as a security feature singularly and/or in combination with other security features, such as QR codes, barcodes and/or serial numbers that can be imprinted on the substrate.

The pre-defined light spectrum of the spectral marker may preferably be the result of stimulated emission and/or spontaneous emission. In case of stimulated emission, the stimulation may be achieved by at least one or preferably at least two, more preferably at least three, even more preferably at least five and most preferably at least ten discrete stimulation wavelengths. Also, in case of stimulated emission, the stimulation may be achieved by stimulation wavelengths in a range from 10 nm to 4.0 μm, preferably 280 nm to 3.0 μm, more preferably 315 nm to 2.0 μm and most preferably 380 nm to 780 nm. Further, the stimulation wavelengths may be in the spectrum of visible light and/or ultraviolet light and/or near-infrared light. Moreover, the stimulation may also be achieved by a pre-defined intensity of stimulation. The pre-defined light spectrum which the spectral marker emits may be dependent on the stimulation. Thus, a specific security feature can be provided. Further, the pre-defined light spectrum which the spectral marker emits may be analyzed by an analysis device which may be a spectral analysis device. Said analysis device may be capable of stimulating the emission of the pre-defined light spectrum of the spectral marker and/or receive and read the emitted light spectrum. By comparing the received light spectrum with a pre-defined light spectrum, the spectral marker can be recognized and the authenticity of the imprinted substrate can be ensured.

Further, in the method for digital printing on a substrate, the pre-defined light spectrum may include at least one emission peak at a pre-defined wavelength and the at least one emission peak optionally has a pre-defined intensity. For example, the pre-defined wavelength of the at least one emission peak may be measured by means of a spectral analysis device. The at least one emission peak having a pre-defined wavelength may be detected when the spectral marker is stimulated with a certain wavelength and/or intensity. Optionally, when the spectral marker is stimulated with a certain wavelength and/or intensity the emitted intensity of the emission peak may be detected. The intensity may be detected by means of a spectral analysis device which e.g. detects a count rate. Further, the pre-defined light spectrum may include at least two, preferably at least three, more preferably at least four and most preferably at least five emission peaks. The at least one emission peak may be the result of one or more discrete stimulation wavelengths or the stimulation wavelengths in the ranges mentioned above. Moreover, the pre-defined light spectrum may include at least one emission peak, having a pre-defined wavelength and a pre-defined intensity, thus the emitted light spectrum contains more details than a spectrum which is only pre-defined in terms of the wavelength of intensity. Thus, the protection against counterfeiting is increased since counterfeiters would have to copy a pre-defined light spectrum that includes at least one emission peak, having a pre-defined wavelength intensity and a pre-defined wavelength.

The pre-defined light spectrum, particularly the wavelength of the emission peak(s) and/or the intensity of the emission peak(s), may be chosen to provide a recognizable fingerprint of the marker that allows to differentiate an digitally imprinted substrate, comprising the specific marker from substrates that are imprinted differently. Further, the ceramic ink may comprise multiple markers of different type. Thus, the pre-defined spectra of the respective markers can be superimposed to a spectrum representing the recognizable fingerprint.

Moreover, in the method for digital printing on a substrate the substrate may be provided at a temperature of at least 30° C., preferably at least 50° C., more preferably at least 60° C. and most preferably at least 70° C. The substrate may be provided at a temperature of at most 35° C., 45° C., 55° C., 65° C., 75° C. or 85° C. Thus, the substrate is pre-heated prior to digital printing. Providing a pre-heated substrate increases the printing quality and the reliability of the imprint.

Further, the step of providing the substrate may include forming the substrate, in particular a packaging means comprising glass. A packaging means comprising glass may be formed by a blow-blow process or a press-blow process or by other processes including pressing, blowing, sucking and combinations of thereof. The temperature at which the substrate is provided as specified above may be the result of the forming of the substrate. Particularly for printing glass, this is beneficial a separate step of preheating of the substrate prior to digitally printing may be dispensed with. Further, the efficiency may be increased by reducing intermediate steps before digital printing.

In the method for digital printing on a substrate, the digital printing may include a multi-color digital printing. Thereby at least three, optionally at least four, further optionally at least five and even further optionally at least six ceramic inks may be digitally printed on the substrate. At least one of the ceramic inks may comprise a spectral marker. Optionally at least two of the ceramic inks, further optionally at least three and even further optionally each ceramic ink may comprise a spectral marker. Thus, the pre-defined light spectrum may depend on the used ceramic inks and optionally on the coloring of the printed element. This may be beneficial for printing substrates for different customers who require their own security feature and at the same time require a particular printed object on the substrate, such as their individual company logo which comprises a particular combination of colors. Further, with being able to print different ceramic inks including different markers in a multi-color digital printing, the pre-defined spectra of the markers of the individual inks can be superimposed during printing. In other words, the superimposed spectrum can be varied during digital printing by printing the different ceramic inks onto the substrate in a pre-defined manner. Thus, different substrates can be marked individually, without the need of retooling the printer (such as changing print head and/or the loaded ceramic inks).

In the method for digital printing on a substrate, the at least one print element may be digitally printed on the substrate. Moreover, the at least one print element may be one of the following: a label, a pattern, a number, a symbol, a serial number, and/or a machine readable element, such as a data matrix code, a barcode, and/or a QR code.

The print element may be readable by the human eye, machine readable and/or detectable by means of a spectral analysis device. The digital printing allows that the at least one print element may be individualized on each substrate. Exemplarily, on each substrate a different serial number might be printed. Further, combinations are possible, wherein at least one print element, such as a company logo, remains the same for a plurality of substrates and at least another print element, such as a machine readable element, is changed for each individual substrate. As the print element is printed with a ceramic ink comprising a spectral marker, the print element provides a two-stage authentication. In a first stage, the print element can be read (e.g. by a human and/or a machine) and in a second stage, the pre-defined light spectrum of the marker can be detected.

In the method for digital printing on a substrate, the at least one print element may allow to identify an individual substrate and/or a batch of substrates. As above mentioned, the digital printing allows that optionally the at least one print element is individualized on each substrate. This may allow that each substrate, such as a vial for a vaccine, can be identified individually by the respective print element such as a data matrix code, a barcode, and/or a QR code. Further, the at least one print element may allow to identify a batch of substrates. As a batch of substrates, a number of substrates may be considered which was produced in a specific time span, particular production location or defined quantity. The identification of the batch of substrates may occur by detecting the pre-defined light spectrum of the spectral marker of the print element and/or other specifications of the printed element, such as the serial number. The combination of identifying an individual substrate by a respective print element (first stage), such as a data matrix code, and a batch of substrates by the pre-defined light spectrum of the spectral marker (second stage) of the print element allows to securely verify the authenticity of a batch and also allows to trace a single substrate. Exemplarily this combination can be useful to avoid that a charge of counterfeit medical products, such as a batch of vaccine vials, is used and at the same time the whereabouts of an individual medical product, such as a single vaccine vial, may be tracked.

The method for digital printing on a substrate may further comprise at least one of the following steps:
heating and/or cooling the substrate to a temperature of 30° C. to 85° C., prior to digital printing,
heating the substrate to a temperature of 400° C., preferably 500° C., more preferably 570° C. and most preferably 600° C. after digital printing, to burn in the ceramic ink, wherein optionally, the steps of heating and/or cooling, digital printing and heating are repeated,
inspecting the digitally printed substrate.

By heating and/or cooling the substrate to a temperature of 30° C. to 85° C., prior to digital printing, the adhesion and/or printing quality of the subsequently printed ceramic ink may be increased. The heating and/or cooling may be conducted by means of a conveyor oven and/or a continuous cooling system.

By heating the substrate to a temperature of 400° C., preferably 500° C., more preferably 570° C. and most preferably 600° C. after digital printing, to burn in the ceramic ink, the adhesion and/or heat resistance of the ceramic ink may be increased. The heating may be conducted by means of a conveyor oven.

In the method for digital printing on a substrate the inspection of the digitally printed substrate may be done by an optical sensor, such as a camera and/or a spectral analysis device. The inspection of the digitally printed substrate by a spectral analysis device may be required to identify if the light spectrum of the spectral marker in the ceramic ink which is printed on the substrate is in accordance with the pre-defined light spectrum of the spectral marker. Further, the inspection of the digitally printed substrate may be done by means of a camera to identify if the substrate and the ceramic ink meet certain quality standards, e.g. if a glass substrate is free of air inclusions.

In the method for digital printing on a substrate, the substrate may comprise a ceramic material and/or a glass material, in particular borosilicate glass. The substrate optionally substantially consists of a ceramic material and/or a glass material, in particular a borosilicate glass. Further, the substrate may comprise aluminosilicate glass, lead glass and/or alkali silicate glass. Moreover, the substrate may substantially consist of aluminosilicate glass, lead glass and/or alkali silicate glass.

In the method for digital printing on a substrate, the substrate may be a packaging means, particularly a vial. For example, the substrate may be a container for a liquid or a solid, such as a vial, a syringe, a cartridge, a bottle, a cup, a well, a tank and/or the like. Further, said container may serve for storing liquids, particularly medical products, cosmetic products, foods, paints, varnishes, glues and/or the like. Moreover, the container may have a volume of at least 5 ml, 10 ml, 30 ml, 50 ml, 100 ml, 150 ml, 200 ml, 500 ml, 750 ml, 1 L, 1.5 L, 2 L, 5 L, 10 L, 15 L, 25 L, 50 L, 100 L or 200 L, and/or the container may have a volume of at most 5 ml, 10 ml, 30 ml, 50 ml, 100 ml, 150 ml, 200 ml, 500 ml, 750 ml, 1 L, 1.5 L, 2 L, 5 L, 10 L, 15 L, 25 L.

In the method for digital printing on a substrate, the substrate may comprise a curved surface, and wherein the at least one ceramic ink is optionally digitally printed on the curved surface. For printing on a curved surface, the printer may be moved relative to the curved surface, and/or the curved surface may be moved relative to the printer, such that a distance between the printer and the substrate remains substantially equal during digital printing. Printing the at least one ceramic ink on the curved surface may serve as an additional security feature as printing on curved surfaces requires additional knowledge. However, the ceramic ink may also be printed on a non-curved surface of the substrate, such as the bottom of a vial. Thereby it would be possible to avoid that the curvature might impact the printing quality. Further, particularly if the substrate is a glass vial, it might be necessary that the curved surface is transparent, e.g. in order to monitor the filling level.

In the method for digital printing on a substrate, the spectral marker may be not visible in the ceramic ink on the printed substrate. Particularly, the spectral marker may be not visible in the ceramic ink on the printed substrate for the human eye. Thus, the optical properties of the ceramic ink may not be changed for the human eye. Further, in case the spectral marker is not visible in the ceramic ink on the printed substrate a potential product imitator may not recognize the presence of the additional authentication feature in form of the marker. Thus, it is more likely that the pre-defined light spectrum of the marker in not copied.

Further, the spectral marker is optionally translucent. Particularly, the spectral marker may be translucent for the human eye. This may be beneficial for applications where a printing that is visible for the human eye is not desired or even inhibits the functionality of the substrate. Moreover, since the spectral marker may be not visible in the ceramic ink on the printed substrate and/or the spectral marker is optionally translucent the difficulty to counterfeit the printed substrate is increased.

In the method for digital printing on a substrate, the spectral marker may comprise pigments. The pigments are optionally ceramic based pigments. Further, the spectral marker may comprise at least two, preferably at least three, more preferably at least four and most preferably at least five different types of pigments which may differ regarding the light spectrum which they emit, e.g. when they are stimulated. Thus, by choosing respective pigments, the pre-defined light spectrum of the marker can be established.

In the method for digital printing on a substrate, the pre-defined light spectrum of the spectral marker may be in the spectrum of visible light and/or ultraviolet light and/or near-infrared light. Further, the pre-defined light spectrum of the spectral marker may comprise at least one, preferably at least two, more preferably at least three, even more preferably at least five and most preferably at least ten discrete wavelengths (emission peaks). Further, the pre-defined light spectrum of the spectral marker may comprise discrete wavelengths or wavelengths in a range from 10 nm to 4.0 µm, preferably 280 nm to 3.0 µm, more preferably 315 nm to 2.0 µm and most preferably 380 nm to 780 nm. By means of a spectrum which comprises more than at least one discrete wavelength (emission peak) the complexity of the pre-defined light spectrum of the spectral marker may be further increased and the barrier against counterfeiting is increased.

In case multiple discrete wavelengths are used, two adjacent discrete wavelengths may be spaced apart from each other of at most 100 nm, more preferably of at most 50 nm and most preferably of at most 10 nm. The closer adjacent ones of the discrete wavelengths are provided to each other, the more distinguishable pre-defined spectra can be provided.

In the method for digital printing on a substrate the spectral marker may comprise a luminescent emission ink. Particularly, the luminescent emission ink may be a fluorescent emission ink or a phosphorescent emission ink. Thereby the difficulty to counterfeit the spectral marker may be even further increased, since another characteristic feature is added to the spectral marker.

The object is also achieved by a printed container. The printed container comprises a substrate, such as a vial. Further, the printed container comprises an imprint of ceramic ink, comprising a spectral marker, wherein the imprint is digitally printed with a method as specified above. By means of the ceramic ink which comprises the spectral marker it is possible to achieve that the printed container is difficult to counterfeit. Further, the security feature of the pre-defined light spectrum provided by the marker is easy to verify by means of a spectral analysis device.

Further, the object is achieved by a ceramic ink, comprising a spectral marker, wherein the ink is adapted for digital printing according to the above method for digital printing on a substrate. The ceramic ink may be configured as described above. The spectral marker may also be configured as described above.

Still further, the object is achieved by a system for digital printing on a substrate, wherein the system is adapted for carrying out the above described method. The system comprises:

a substrate providing means, wherein the substrate providing means is optionally a glass forming machine, optionally a heating and/or cooling means, wherein the heating and/or cooling means is optionally a continuous oven, a digital printing means, wherein the digital printing means is optionally an inkjet printer;

optionally a heating device, wherein the heating device is optionally an annealing lehr, and optionally an inspecting means, wherein the inspecting means is optionally includes at least one optical sensor, such as a camera and/or a spectral analysis device.

With the system, the advantages described above with respect to the method for digital printing on a substrate can be achieved.

BRIEF DESCRIPTION OF THE DRAWINGS

In the following, the accompanying figures are briefly described, wherein.

DETAILED DESCRIPTION OF THE INVENTION

Figure 1:
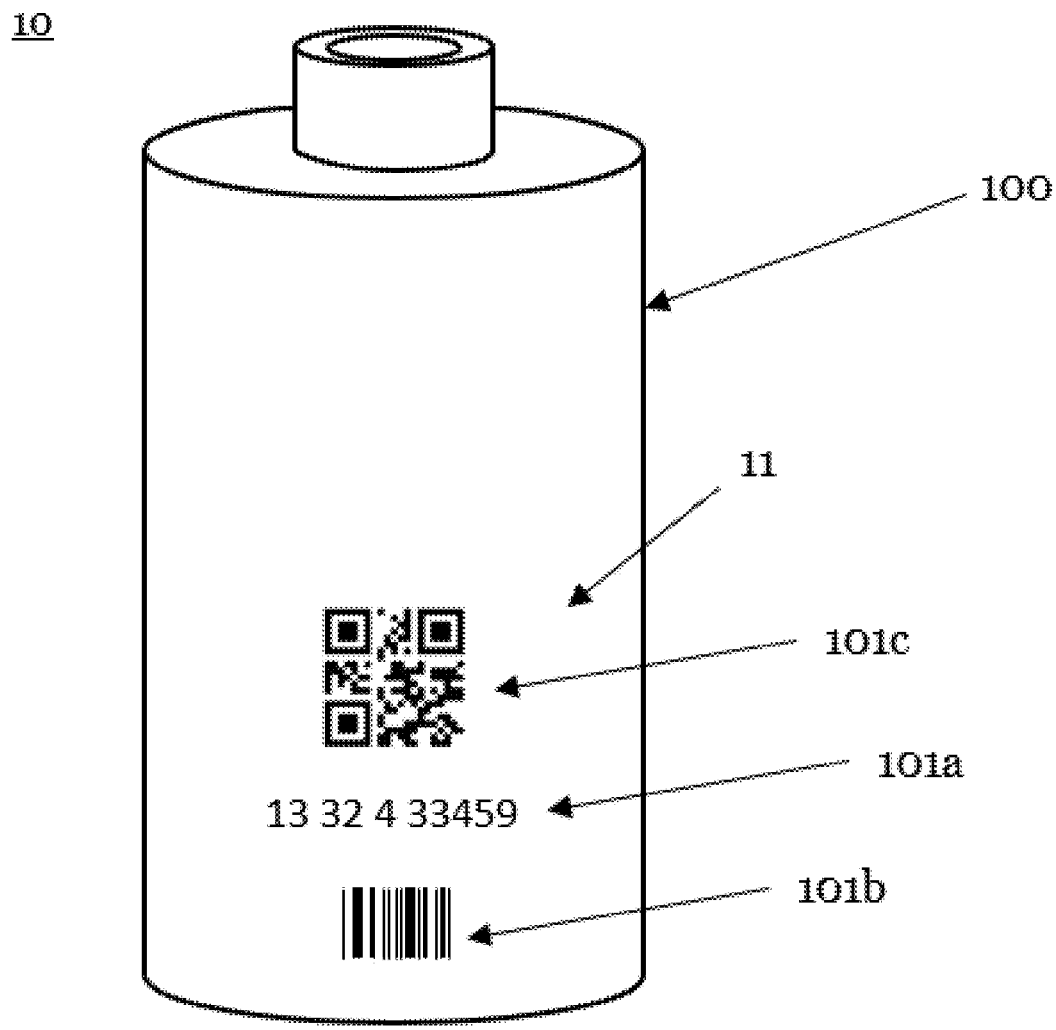
FIG. 1 is a schematic view of a printed container.

FIG. 1 is a schematic view of a printed container 10, comprising a substrate 100, such as a vial, and an imprint 11 of ceramic ink, comprising a spectral marker, wherein the imprint 11 is digitally printed with a method 500 which is described below. In FIG. 1 the imprint 11 comprises three print elements 101. Namely, a serial number 101*a*, a barcode 101*b* and a QR code 101*c*. The serial number 101*a*, the barcode 101*b* and/or the QR code 101*c* are digitally printed 530 on the substrate 100. Thereby a ceramic ink comprising a spectral marker is used. The spectral marker is configured to emit a pre-defined light spectrum. Thus, a two stage authentication of the printed container 10 is possible.

The container 10, may be a glass container, a ceramic container and/or a glass-ceramic container. The container 10 may be filled with any goods, such as solids, liquids and/or gasses (not shown). Further, the shown container 10 may be a vial, particularly comprising borosilicate glass, which may be filled with a vaccine.

By combining the individual serial number 101*a* and/or the barcode 101*b* and/or the QR code (as shown in FIG. 1) with the pre-defined light spectrum of the spectral marker it may be possible to provide an optimized security feature. First, the individualized serial number 101*a* and/or the barcode 101*b* and/or the QR code may enable the individual tracking of each substrate (first stage). Second, the pre-defined spectral marker may allow to identify whether the ceramic ink on the substrate is authentic or was counterfeited (second stage).

Figure 2:
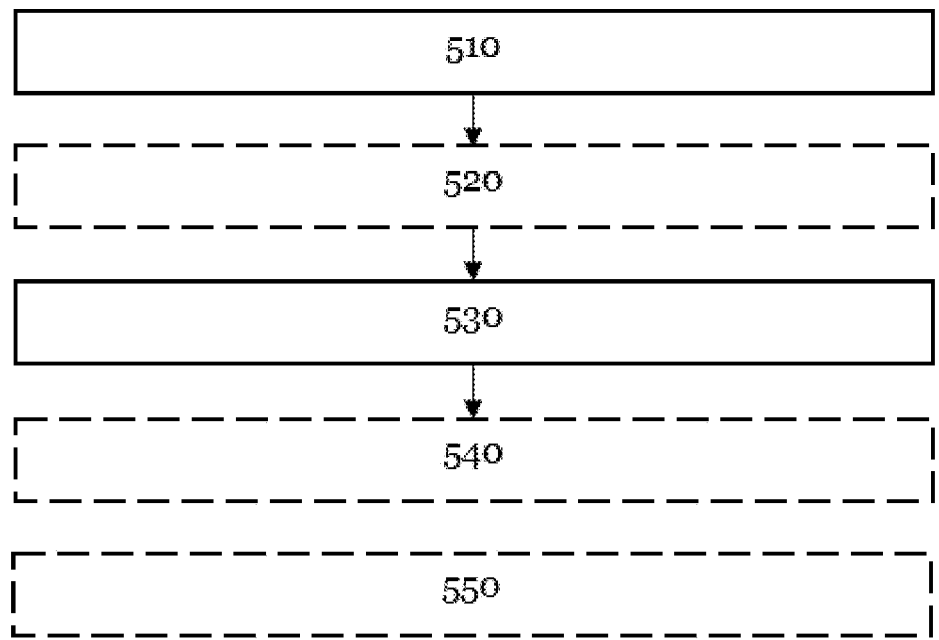
FIG. 2 is a flow chart of a method for digital printing on a substrate.

FIG. 2 is a flow chart of the method 500 for digital printing on a substrate. The method 500 comprises the steps of
- providing 510 the substrate 100,
- optionally heating and/or cooling 520 the substrate 100 to a temperature of 30° C. to 85° C., prior to digital printing 530,
- digital printing 530 at least one ceramic ink on the substrate 100, wherein the at least one ceramic ink comprises a spectral marker, wherein the spectral marker is configured to emit a pre-defined light spectrum.
- optionally heating 540 the substrate 100 to a temperature of 400° C., preferably 500° C., more preferably 570° C. and most preferably 600° C. after digital printing 530, to burn in the ceramic ink, wherein optionally, at least one of the steps of heating and/or cooling 520, digital printing 530 and heating 540 are repeated,
- optionally inspecting 550 the digitally printed substrate 100.

Figure 3:
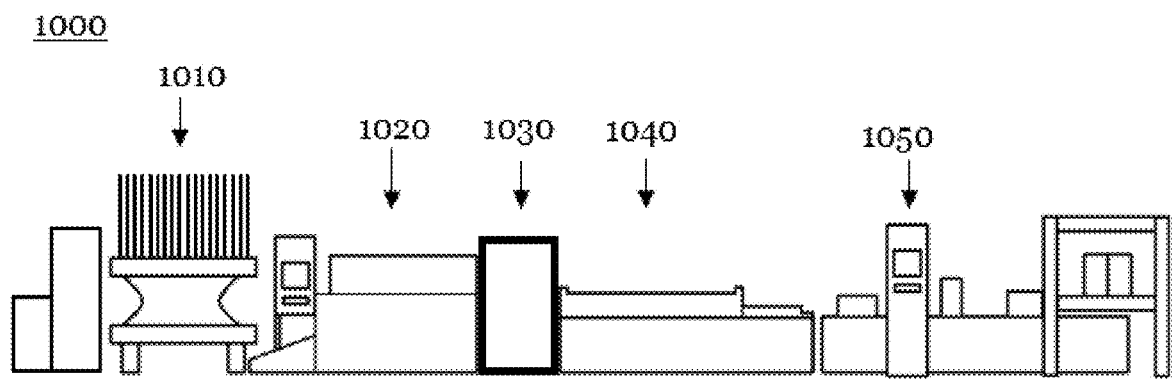
FIG. 3 is a schematic view of a system for digital printing on a substrate.

FIG. 3 is a schematic view of a system for digital printing on a substrate. The system comprises:
- a substrate providing means 1010, wherein the substrate providing means is optionally a glass forming machine,
- optionally a heating and/or cooling means 1020, wherein the heating and/or cooling means is optionally a continuous oven,
- a digital printing means 1030, wherein the digital printing means is optionally an inkjet printer;
- optionally a heating device 1040, wherein the heating device is optionally an annealing lehr, and
- optionally an inspecting means 1050, wherein the inspecting means optionally includes at least one optical sensor, such as a camera and/or a spectral analysis device.

Figure 4:
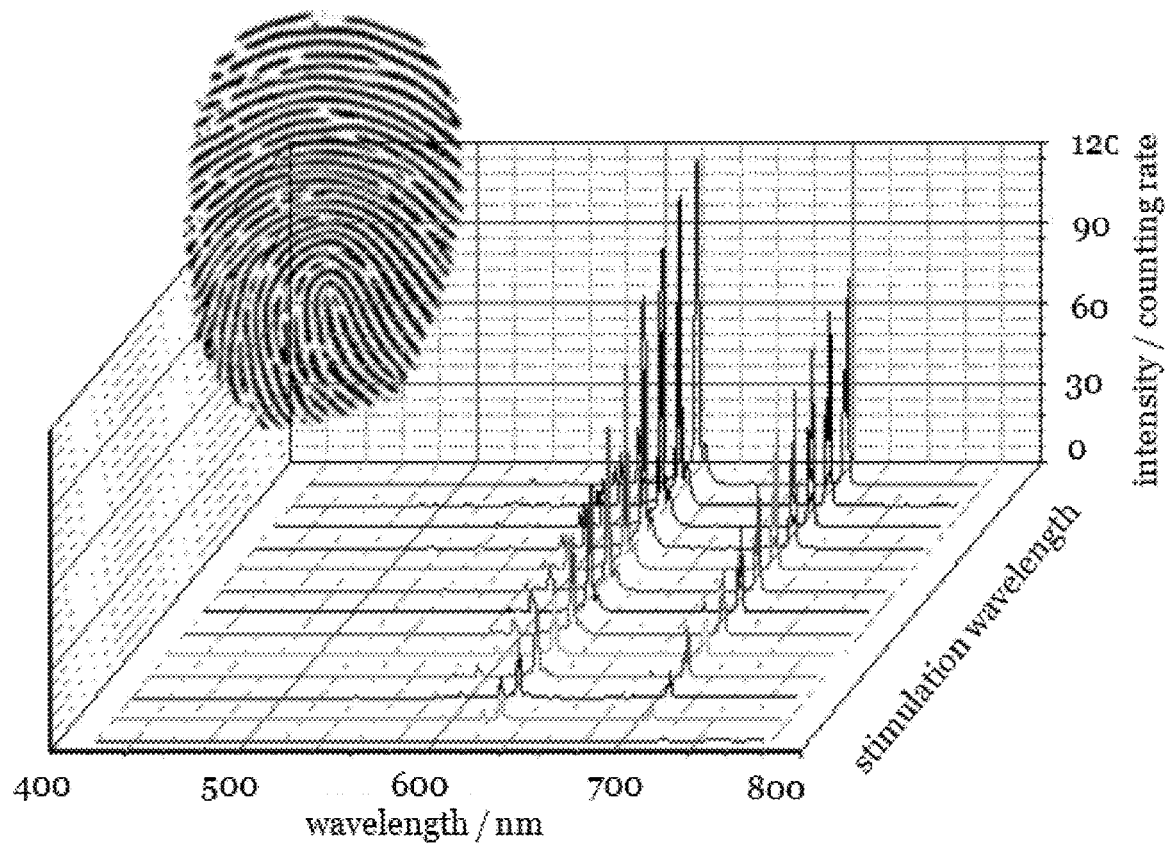
FIG. 4 is a schematic illustration of a pre-defined light spectrum of a spectral marker.

FIG. 4 is a schematic illustration of a pre-defined light spectrum of a spectral marker. The pre-defined light spectrum may be detected by means of a spectral analysis device. As depicted, thirteen discrete stimulation wavelengths result in a pre-defined light spectrum that includes multiple emission peaks (discrete wavelengths). Thereby the wavelengths of the emission peaks are pre-defined. Further, also the intensities of the emission peaks are pre-defined, e.g. by a specification of the counting rate. By pre-defining the wavelengths of the emission peaks and the intensities of the emission peaks, the pre-defined light spectrum of the spectral marker is defined and the difficulty of coping the security feature is increased. Thus, a high level of security against counterfeiting is obtained.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

LIST OF REFERENCE SIGNS 10 printed container
11 imprint
100 support member
101 print element
101a serial number
101b barcode
101c QR code
500 method for digital printing on a substrate
510 providing the substrate
520 heating and/or cooling the substrate
530 digital printing the substrate
540 heating the substrate
550 inspecting the substrate
1000 system for digital printing on a substrate
1010 substrate providing means 1020 heating and/or cooling means
1030 digital printing means
1040 heating device
1050 inspecting means

The invention claimed is:

1. A method for digital printing on a substrate, in particular a packaging means comprising glass, the method comprising the following steps:
   a. providing the substrate, and
   b. digital printing at least one ceramic ink on the substrate, wherein
   the at least one ceramic ink comprises a spectral marker, wherein
   the spectral marker is configured to emit a pre-defined light spectrum, wherein the pre-defined light spectrum comprises at least two emission peaks at discrete pre-defined wavelengths spaced apart from each other by at most 50 nm, wherein the at least two emission peaks each has a pre-defined intensity.

2. The method for digital printing on a substrate according to claim 1, wherein the at least two emission peaks at discrete pre-defined wavelengths are spaced apart from each other by at most 10 nm.

3. The method for digital printing on a substrate according to claim 1, wherein the substrate is provided at a temperature of at least 30° C., wherein the step of providing the substrate includes forming the substrate.

4. The method for digital printing on a substrate according to claim 1, wherein the digital printing includes a multi-color digital printing, and wherein at least three ceramic inks are digitally printed on the substrate, wherein at least one of the ceramic inks comprises a spectral marker.

5. The method for digital printing on a substrate according to claim 1, wherein at least one print element is digitally printed on the substrate, and wherein the at least one print element is one of the following: a label, a pattern, a number, a symbol, a serial number, and/or a machine readable element.

6. The method for digital printing on a substrate according to claim 5, wherein at least one print element allows to identify an individual substrate and/or a batch of substrates.

7. The method for digital printing on a substrate according to claim 1, wherein the method further comprises at least one of the following steps:
   c. heating and/or cooling the substrate to a temperature of 30° C. to 85° C., prior to digital printing,
   d. heating the substrate to a temperature of 400° C. after digital printing, to burn in the ceramic ink, wherein, at least one of the steps of heating and/or cooling, digital printing and heating are repeated,
   e. inspecting the digitally printed substrate.

8. The method for digital printing on a substrate according to claim 7, wherein the inspection of the digitally printed substrate is done by an optical sensor.

9. The method for digital printing on a substrate according to claim 1, wherein the substrate comprises a ceramic material and/or a glass material, in particular borosilicate glass, and wherein
the substrate optionally substantially consists of a ceramic material and/or a glass material, in particular a borosilicate glass, wherein
the substrate optionally is a packaging means, particularly a vial, and wherein
the substrate further optionally comprises a curved surface, and wherein the at least one ceramic ink is digitally printed on the curved surface.

10. The method for digital printing on a substrate according to claim 1, wherein the spectral marker is not visible in the ceramic ink on the printed substrate, and wherein
the spectral marker is optionally translucent, and/or wherein
the spectral marker further optionally comprises pigments, wherein the pigments are optionally ceramic based pigments.

11. The method for digital printing on a substrate according to claim 1, wherein the pre-defined light spectrum of the spectral marker is in the spectrum of visible light and/or ultraviolet light and/or near-infrared light.

12. The method for digital printing on a substrate according to claim 1, wherein the spectral marker is a luminescent marker, and wherein the luminescent marker optionally is a luminescent emission ink.

13. A printed container, comprising:
a substrate, such as a vial, and
an imprint of ceramic ink, comprising a spectral marker, wherein the imprint is digitally printed with a method according to claim 1.

14. A ceramic ink, comprising a spectral marker, wherein the ink is adapted for a method of digital printing according to claim 1.

15. A system for digital printing on a substrate, wherein the system is adapted for carrying out a method according to claim 1, wherein the system comprises:
a substrate providing means, wherein the substrate providing means is a glass forming machine,
a heating and/or cooling means, wherein the heating and/or cooling means is a continuous oven,
a digital printing means, wherein the digital printing means is an inkjet printer;
optionally a heating device, wherein the heating device is an annealing lehr, and
an inspecting means, wherein the inspecting means includes at least one optical sensor.

16. The method for digital printing on a substrate according to claim 1, wherein the pre-defined light spectrum comprises at least three emission peaks at discrete pre-defined wavelengths, wherein two adjacent wavelengths of the discrete pre-defined wavelengths are spaced apart from each other by at most 50 nm.

17. The method for digital printing on a substrate according to claim 1, wherein the pre-defined light spectrum comprises at least three emission peaks at discrete pre-defined wavelengths, wherein two adjacent wavelengths of the discrete pre-defined wavelengths are spaced apart from each other by at most 10 nm.

* * * * *